US006577351B1

(12) United States Patent
Yu et al.

(10) Patent No.: US 6,577,351 B1
(45) Date of Patent: Jun. 10, 2003

(54) ANTI-ALIASING TELEVISION SIGNALS FOR DISPLAY

(75) Inventors: Chee Yu, Dublin, CA (US); David Mott, Mountain View, CA (US); James Helman, San Carlos, CA (US)

(73) Assignee: Liberate Technologies, San Carlos, CA (US)

(*) Notice: Subject to any disclaimer, the term of this patent is extended or adjusted under 35 U.S.C. 154(b) by 0 days.

(21) Appl. No.: 09/081,033

(22) Filed: May 18, 1998

(51) Int. Cl.$^7$ ............................................... H04N 5/217
(52) U.S. Cl. ........................ 348/624; 348/630; 345/611
(58) Field of Search .............................. 348/630, 607, 348/624; 382/269; 345/611–616

(56) References Cited

U.S. PATENT DOCUMENTS

| | | | |
|---|---|---|---|
| 4,035,835 A | | 7/1977 | Poetsch |
| 4,704,605 A | * | 11/1987 | Edelson ...................... 340/728 |
| 5,155,847 A | | 10/1992 | Kirouac et al. |
| 5,261,030 A | * | 11/1993 | Brocke ........................ 395/135 |
| 5,373,561 A | | 12/1994 | Haber et al. ................... 380/49 |
| 5,436,673 A | | 7/1995 | Bachmann |
| 5,444,861 A | | 8/1995 | Adamec et al. |
| 5,453,779 A | | 9/1995 | Dan et al. ....................... 348/7 |
| 5,495,610 A | | 2/1996 | Shing et al. |
| 5,497,422 A | | 3/1996 | Tysen et al. .................. 380/25 |
| 5,541,638 A | | 7/1996 | Story ............................. 348/7 |
| 5,600,364 A | | 2/1997 | Hendricks et al. ............. 348/1 |
| 5,634,051 A | | 5/1997 | Thomson ....................... 707/5 |
| 5,680,458 A | | 10/1997 | Spelman et al. |
| 5,708,845 A | | 1/1998 | Wistendahl et al. ........ 345/302 |
| 5,727,129 A | | 3/1998 | Barrett et al. .......... 395/200.47 |
| 5,752,042 A | | 5/1998 | Cole et al. |

(List continued on next page.)

OTHER PUBLICATIONS

Rosenfeld L B, et al: "Automated Filtering Of Internet Postings" Online, vol. 18, No. 3, May 1994, pp. 27–30, XP000616769 see the whole document.
Yan T W, et al: "Sift—A Tool For Wide–Area Information Dissemination" Usenix Technical Conference, Jan. 16, 1995, pp. 177–186, XP000617276 see the whole document.
Bussey H E et al: "Service Architecture, Prototype Description, And Network Implications Of A Personalized Information Grazing Service" Multiple Facets Of Integration,San Francisco,Jun. 3–7, 1990 Institute Of Electrical And Electronic Engineers, pp. 1046–1053, XP000164339 see whole document.
Wyle M F: "A Wide Area Network Information Filter" Proceedings International Conference Artificial Intelligence On Wall Street, Oct. 9, 1991, pp. 10–15, XP000534152 see the whole document.
Lang K: "NewsWeeder: learning to filter netnews" Machine Learning. Proceedings Of The Twelfth International Conference On Machine Learning, Tahoe City, CA, USA, Jul. 9–12, 1995, San Francisco, CA, USA, Morgan Kaufmann Publishers, USA, pp. 331–339, XP002046557 see the whole document.

Primary Examiner—Victor R. Kostak
(74) Attorney, Agent, or Firm—Glenn Patent Group; Michael A. Glenn; Kirk Wong

(57) ABSTRACT

The invention provides an improved method and system for presenting television signals, including anti-aliasing of text with respect to a background. The background color is determined relatively locally for each element to be anti-aliased, and text or other graphics overlaid on that background are anti-aliased with respect to each relatively local background color. Also, anti-aliasing can be applied to blur text and graphics more vertically than horizontally to reduce flicker, and to blur chrominance more than luminance to reduce cross-chrominance artifacts resulting from Y/C separation. Similar techniques may be used for filtering images in addition to anti-aliasing text characters.

42 Claims, 2 Drawing Sheets

U.S. PATENT DOCUMENTS

| | | | |
|---|---|---|---|
| 5,754,938 A | 5/1998 | Herz et al. | 395/200.49 |
| 5,754,939 A | 5/1998 | Hertz et al. | 455/4.2 |
| 5,761,306 A | 6/1998 | Lewis | 380/21 |
| 5,764,992 A | 6/1998 | Kullick et al. | |
| 5,787,172 A | 7/1998 | Arnold | 380/21 |
| 5,796,840 A | 8/1998 | Davis | 380/50 |
| 5,808,628 A | 9/1998 | Hinson | |
| 5,809,287 A | 9/1998 | Stupeck, Jr. et al. | |
| 5,850,232 A | 12/1998 | Engstrom et al. | 345/511 |
| 5,859,969 A | 1/1999 | Oki et al. | |
| 5,867,166 A | 2/1999 | Myhrvold | |
| 5,870,765 A | 2/1999 | Bauer et al. | 707/203 |
| 5,874,967 A | 2/1999 | West et al. | 345/435 |
| 5,877,741 A | 3/1999 | Chee et al. | 345/113 |
| 5,910,805 A * | 6/1999 | Hickey et al. | 345/467 |
| 5,926,624 A | 7/1999 | Katz et al. | |
| 5,936,606 A | 8/1999 | Lie | 345/113 |
| 5,940,080 A * | 8/1999 | Ruehle et al. | 345/432 |
| 5,977,960 A | 11/1999 | Nally et al. | 345/191 |
| 5,999,207 A * | 12/1999 | Rodriguez et al. | 348/14 |
| 6,005,574 A | 12/1999 | Herrod | 345/344 |
| 6,009,363 A | 12/1999 | Beckert et al. | 701/33 |
| 6,018,768 A | 1/2000 | Ullman et al. | 709/218 |
| 6,028,583 A | 2/2000 | Hamburg | 345/112 |
| 6,047,269 A | 4/2000 | Biffar | 705/39 |
| 6,049,628 A | 4/2000 | Chen | |
| 6,049,835 A | 4/2000 | Gagnon | 709/245 |
| 6,104,727 A | 8/2000 | Moura et al. | 370/468 |
| 6,154,576 A * | 11/2000 | Anderson et al. | 382/264 |
| 6,172,717 B1 * | 1/2001 | Ebihara | 348/586 |
| 6,229,521 B1 * | 5/2001 | Yip | 345/136 |
| 6,320,982 B1 * | 11/2001 | Kurzweil et al. | 382/173 |

\* cited by examiner

ANTI-ALIASING TELEVISION SIGNALS FOR DISPLAY

CROSS-REFERENCE TO RELATED APPLICATIONS

This application claims priority of the following applications:

Application Ser. No. 08/770,238, filed Dec. 20, 1996, in the name of inventors Wei Yen and Steven Weinstein, titled "Internet Multiplexer for Broadcast and Other Information;"

Provisional Application Ser. No. 60/047,809, filed May 12, 1997, in the name of inventors Weinstein et al., titled "User Interface;"

Each of these applications is hereby incorporated by reference as if fully set forth herein.

BACKGROUND OF THE INVENTION

1. Field of the Invention

The invention relates to television signals.

2. Related Art

In displaying television signals including detailed information, such as text (or other relatively sharp or small images, including icons, chyrons, or graphical line art), it is desirable for the displayed images to be displayed sharply but without visual artifacts resulting from finite-size pixels or from Y/C separation. In the known art anti-aliasing is one method for reducing visual artifacts when the image is small relative to the available pixels.

One problem in the known art is selection of a background color with respect to which to perform anti-aliasing. In particular, performing anti-aliasing with respect to a single color, namely the constant background color is more effective than when the background includes a range of colors. This problem is exacerbated when the background is a dynamically changing image, such as a slide show, another animated graphical display, or a video display such as broadcast television.

Accordingly, it would be desirable to provide an improved method and system for presenting television signals, including anti-aliasing of text with respect to a background. This advantage is achieved in an embodiment of the invention in which the background color is determined relatively locally, and text or other graphics overlaid on that background are anti-aliased with respect to each relatively local background color.

SUMMARY OF THE INVENTION

The invention provides an improved method and system for presenting television signals, including anti-aliasing of text with respect to a background. The background color may be determined relatively locally for each element to be anti-aliased, and text or other graphics overlaid on that background are anti-aliased with respect to each relatively local background color. Therefore the invention comprises a background color detector for dynamically determining the background colors of displayed images or text and some form of anti-aliasing processor for anti-aliasing the edges of those displayed images or text based upon the dynamically determined background colors.

Also, in an embodiment of the invention, anti-aliasing is used to blur text and graphics more vertically than horizontally to reduce flicker from interlaced display. Further, in an embodiment of the invention, anti-aliasing can blur chrominance more than luminance to further reduce cross-chrominance beyond the reduction already achieved by anti-aliasing.

DETAILED DESCRIPTION OF THE PREFERRED EMBODIMENT

In the following description, a preferred embodiment of the invention is described with respect to preferred process steps and data structures. However, those skilled in the art would recognize, after perusal of this application, that embodiments of the invention may be implemented using one or more general purpose processors (or special purpose processors adapted to the particular process steps and data structures) operating under program control, or other special purpose circuits, and that implementation of the preferred process steps and data structures described herein using such equipment would not require undue experimentation or further invention.

Application and System Elements

The invention provides an improved method of anti-aliasing text for display on a television or other comparable video monitor.

In particular, the present invention addresses several sources of video artifacts, which may improve the quality of the visual presentation of text not only on standard television screens but on other video monitors as well. A variety of other applications will be obvious to those skilled in the art, and hence, the present description is meant to be illustrative and not limiting to the invention.

Application

An application of the instant invention is the display of text from a computer onto a television screen. Text generated by a computer is often difficult to read when so displayed on a standard television, due to increased video artifacts associated with the lower resolution and other characteristics of the television screen. As described above, prior art anti-aliasing techniques may fail to provide sufficient textual clarity. This makes display of text on standard televisions problematic. This invention solves these problems.

For example, it is desirable to display on a television world-wide web 'pages' or other documents generated using HTML (Hyper-Text Markup Language), the language in which web pages are presently written. The visual components of such documents comprise combinations of graphic and textual material. Frequently on such pages, text is displayed directly over graphic images. In particular, this invention addresses the problem of increasing the clarity of such visual displays on standard television screens.

System Elements

Figure 1:
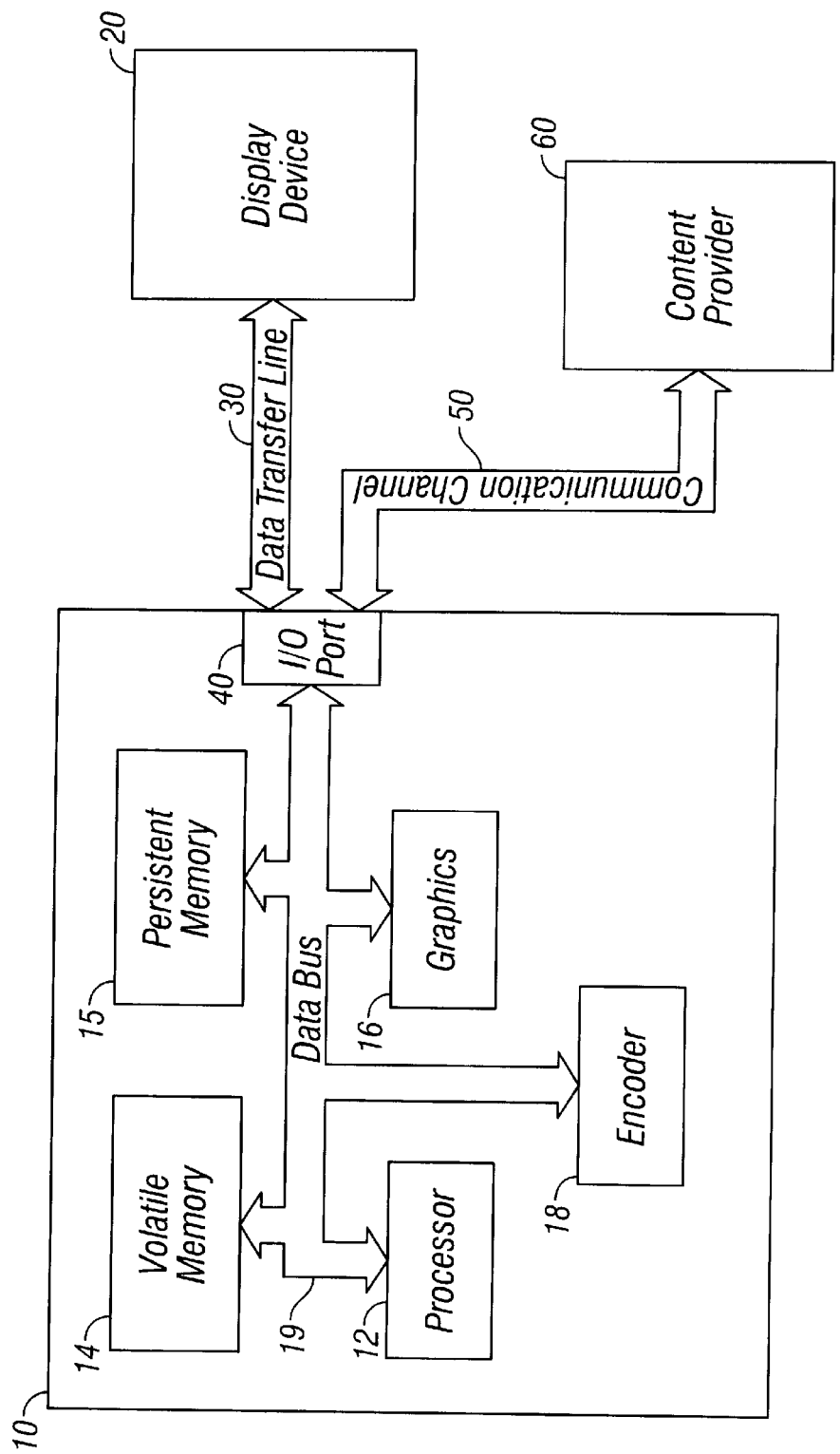
FIG. 1 shows a block diagram of a system for anti-aliasing television signals for display.

FIG. 1 shows a block diagram of a system for anti-aliasing television signals for display.

A set top device 10 has a processor 12 connected to a volatile memory 14, a persistent memory 15, a graphics processor 16, and an encoder 18 through a data bus 19. Display device 20 is connected to set top device 10 via data transmission line 30. Content provider 60 is connected to set top device 10 via communication channel 50.

Communication channel 50 comprises a telephone line, ISDN line, cable, fiberoptic, or any other data transfer line and is connected to network interface device connected to, or contained within, I/O port 40. Such a connection links client device 10 through a network, either a private intranet or the public Internet to any of a plurality of content providers 60.

Method of Operation

Figure 2:
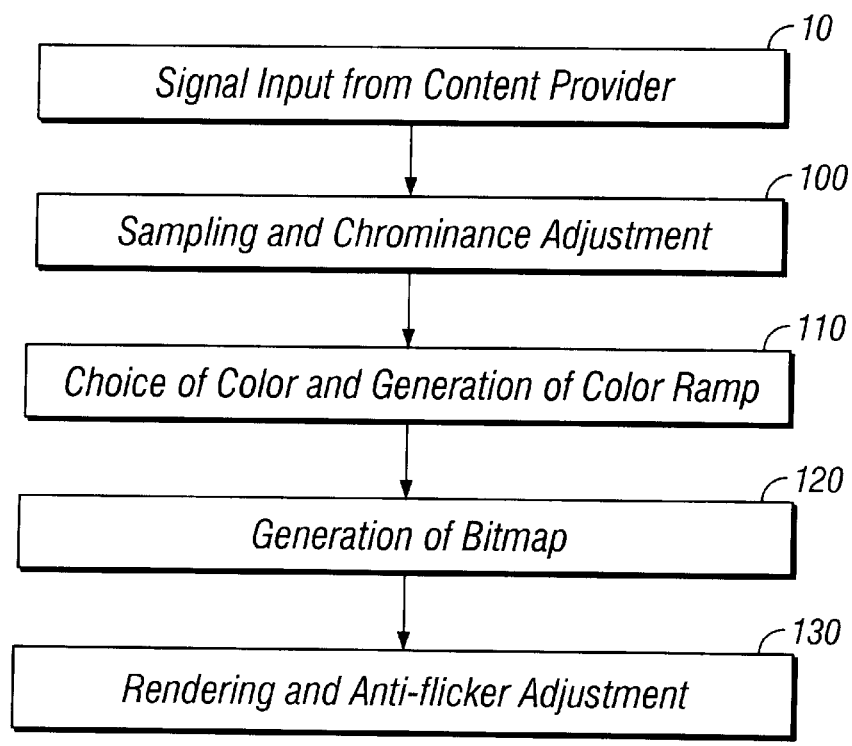
FIG. 2 shows a process flow diagram of a method for anti-aliasing television signals for display.

FIG. 2 shows a process flow diagram of a method for anti-aliasing television signals for display.

Initially, a signal is sent from content provider 60 to set top device 10 via communication channel 50. From the standpoint of the user set top device 10 acts as black box and all of the graphics processing is transparent to the user. Furthermore, since the rudiments of graphics processing are known in the art we will not treat them here but rather we will disclose the inventive process steps. There are four important steps to rendering fonts through anti-aliasing which contribute to displaying characters which are legible and free from visual artifacts: sampling and chrominance adjustment, choice of colors and generation of color ramp, generation of gray scale bitmap, and rendering colors.

Sampling and Chrominance Adjustment

First, the foreground and the background are sampled and chrominance adjusted. The nature of the step of determining foreground and background color depends on the nature of the textual material being displayed on the screen of display device 40. There are several methods by which background colors may be set on a display. Certain pre-determined color schemes may be preset by the manufacturer as part of the display system. These may be either set in the hardware of a video display (either hardwired into the display or set in a reprogrammable persistent memory) or in the software which is used to display the documents, such as web browser. This method of setting colors has advantages ideal for anti-aliasing, as it allows the manufacturer to set colors which minimize artifacts.

In addition, users may change the system defaults, either directly or through inference from usage. For example, all major web browsing software allow users to define default values for text and backgrounds. Also, color settings in the display monitor itself may be set by changing values in the reprogrammable persistent memory. While allowing the user to choose colors is less desirable from the point-of-view of minimizing aliasing artifacts, it does allow the user to choose colors which are more legible or visually appealing to the user on their particular video display. Determining the background color is simple, as it is pre-specified by the user.

Furthermore, HTML tags or other instructions which set colors may be embedded directly in the document by the document's author. This is a common practice, as it gives the document's author greater control over the visual presentation. Such instructions ordinarily take precedence over any values specified by the video manufacturer, web browser or user settings. Determining the background color is again simple, as it is directly specified.

Finally, text may be superimposed over graphic elements in the page, and hence the background color for the text characters will be defined by the underlying graphics. This is the most complex situation for determining the background color to use for anti-aliasing, as the color may vary both globally, over the entire document, and locally, over one or more adjacent characters. Furthermore, the graphic element may change with time, such as image slide shows, animated graphics, television broadcasts, video-camera feeds, etc. Hence, the background color of the characters may be changing with time.

Where the background color varies with the document's content, several methods may be used for determining background color 100. A color histogram 302 may be generated for the entire document or frame 301, from which an appropriate determination of background may be derived. Alternatively, a locally weighted histogram 304 may be generated for each pixel or for blocks of pixels 303. Such an approach is more computation-intensive, but may be necessary when the colors are expected to vary widely over the entire document or frame. Finally, character edge pixels for entire document or frame may be considered, and a background color determined by similar methods as determining the background for the entire document.

In each of the above instances, "local" anti-aliasing may be applied with respect to background color to improve the clarity of the text where "local" refers to anti16 aliasing on a per pixel or per string basis. The anti-aliasing procedure may be determined for each individual character as an average over the edges of that character or localized cluster of characters, based upon background colors determined by the methods described above. Alternatively, the background color and anti-aliasing characteristics may be determined separately for each edge pixel. In either case the determination of the background color may be based upon a global background color or upon a "local" background color determined as described above.

More specifically, data which represents the video portion of the signal received by set top device 10 at step 10 is chrominance adjusted at step 100. In particular, the entire foreground color displayed on the display device 40 is chrominance adjusted globally for each text color, and the background color is chrominance adjusted "locally" on a per pixel basis.

Color Ramp Generation

As noted above, the background color may change over time if a dynamically-varying image is used as the background to the text. In such a case, the background color must be redetermined and anti-aliasing recomputed. Such recomputation may be performed either on a regular basis at pre-determined time intervals, or when the image locally changes by more than a pre-determined threshold amount. Also, some digital video formats, such as MPEG, utilize techniques which may redraw only portions of the image which have changed. The present invention may take advantage of such techniques by only recomputing background color for areas where such redraws occur.

In addition to applying anti-aliasing locally with respect to background color, the width of the color ramp used in anti-aliasing may be varied to improve clarity of the text characters. For example, blurring out the edge of the character over a wider transition range will reduce sudden changes in color that can cause Y/C separation artifacts (chrominance crossing over into luminance) on composite video display devices. However, for small characters, significant blurring will seriously degrade legibility. Hence, the transition range is often made more narrow than needed to eliminate Y/C separation. The particular methods used to widen anti-alias ramps and applying them to the edges of a graphic image, such as a text character, are well known to those skilled in the art of the present invention.

One embodiment of the present invention addresses the problem of Y/C separation artifacts by blurring chrominance (C) more than luminance (Y). Hence, separate ramps may be used for the Y component than for the C components, with a wider ramp used for the C components than the Y component in this case.

For example, the anti-aliasing begins at step 110 wherein the closest colors to the foreground and background colors are chosen from a color map. From the two colors chosen at step 110, a linear color ramp is constructed of width w between the two (R,G,B) colors, such that (Rb, Gb, Bb), the background anti-aliasing color and (Rf, Gf, Bf), the foreground anti-aliasing color is an array of (R, G, B) values where for each component $$R[n]=Rb*(w-n)/(w+1)=Rf*(n+1)/(w+1)$$

For n=(0,1, . . . , w−1).

However, due to the non-linearity of TV displays, a linear ramp of values in the frame buffer does not result in a linear ramp of intensities being displayed on the screen of display device 40 unless the set top device 10 includes built in gamma correction among its processing capabilities. The gamma correction may be implemented in hardware or software, however it is necessary that the gamma correction be done with respect to the black output level. In particular, for a system with a gamma of g (for television sets typically: 221 g<3), a black value of (R, G, B)=(min, min, min) and a white value of (R, G, B)=(max, max, max), the gamma corrected ramp of width w between (Rb, Gb, Bb,) and (Rf, Gf, Bf) is:

$$R[n]=\min=(\max-\min)*(((Rb-\min)/(\max-\min)*(w-n)/(w+1))^g + ((Rf-\min)/(\max-\min)*(n+1)/w+1)^(1/g)$$

For n=(0,1, . . . , w−1).

Bitmap Generation

After, the color ramp has been generated at step 110 according to the above equation and any necessary gamma correction performed, a bitmap is generated at step 120 wherein the text characters are represented in gray scale with four or six levels of gray. A full background color would be assigned a value of 0 while a full foreground color will be assigned a value of 3.

According to the invention, anti-aliasing may be performed for each character to take into account variations of background color and differences in chrominance and luminance between background and foreground colors. Also, the width over which the edge of a character is anti-aliased i.e. the width of the convolution kernel may be varied.

Rendering and Anti Flicker Adjustment

For example, at step 130, the pixels are rendered and the adaptive transition width is adjusted to enhance the display clarity. The width of the transition from the background to the foreground depends on the point size of the font being used. Therefore, blurring out the edge of a character with a wider transition range helps to reduce sudden changes in color that can cause Y/C separation artifacts on the display device.

An additional artifact problem is flicker created along horizontal edges caused by interlaced displays without a hardware flicker filter. Interlaced images, such as those used in NTSC and PAL, draw each screen image as two frames comprised of every other screen line, with the two frames offset by a line to form a combined (interlaced) image. Interlacing was originally introduced to compensate for slow vertical scan, which would result in refresh from the top to bottom of the screen introducing motion artifacts. One of the technical disadvantages of interlacing is occasional flicker along vertical color transitions, such as those along horizontal edges, which is problematic for text characters.

Some video devices compensate for this flicker artifact by using an antiflicker circuit which performs a vertical low-pass filter or convolution on the image either in the frame-buffer or as it is scanned out to video. Unfortunately, many video devices lack this hardware feature.

One embodiment of the present invention addresses the flicker problem by adjusting the anti-aliasing color ramps to have different widths horizontally and vertically, with a wider ramp vertically than horizontally. This allows a greater width ramp in one direction (vertical) without unduly compromising legibility of the character. Typically, the flicker reduction can be done as part of the font rendering pass without any degradation in performance. This particular embodiment addresses the instance where there is no hardware flicker filter. In the instance where there is a hardware flicker filter which blurs vertically, anti-aliasing is performed less vertically than horizontally.

While the above discussion describes the process of displaying text characters upon a television screen, as this is a particularly problematic application, it will be obvious to those skilled in the art that the invention may be applied to a variety of small images, such as icons, elements of graphic user interfaces (GUIs), etc. and to a variety of different video displays.

More specifically, the present invention may be applied to image filtering, as opposed to text edge anti-aliasing. Y/C separation artifacts may be corrected by applying a wider filter kernel for the C components than for the Y component. Similarly, flicker may be diminished by applying a wider filter kernel in the vertical direction than in the horizontal direction. Thus, the same techniques used to diminish artifacts for characters may be used to diminish artifacts on other displayed images.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A system for anti-aliasing the edges of images displayed against a background on a display unit, said system comprising:

a background color detector for dynamically determining background color; and an anti-aliasing processor for anti-aliasing the edges of images based upon said dynamically determined background color;

wherein said background color detector adjusts chrominance values for foreground color displayed on said display unit globally and adjusts chrominance values for background color displayed on said display unit locally.

2. The system of claim 1, wherein said images comprise characters of text obtained from a source document and wherein the background color is determined by instructions embedded in the source document.

3. The system of claim 2, wherein said instructions embedded in the source document comprise HTML tags.

4. The system of claim 1, wherein said background color is determined by user controls set by the user.

5. The system of claim 1, wherein said background color is determined by user controls derived from user actions.

6. The system of claim 1, wherein said background color is determined by manufacturer controls, set by the manufacturer of the display unit.

7. The system of claim 1, wherein said images comprise characters of text superimposed upon a graphic image and wherein the background color is determined by the content of said graphic image.

8. The system of claim 7, wherein said content includes a color histogram for an entire document.

9. The system of claim 7, wherein said content includes a locally-weighted color histogram for a plurality of pixels.

10. The system of claim 7, wherein said content includes a locally-weighted color histogram for at least one block of pixels.

11. The system of claim 7, wherein said content includes a color histogram for edge pixels for the entire source document.

12. The system of claim 1, wherein said anti-aliasing is based upon the background color for each edge pixel.

13. The system of claim 1, wherein said anti-aliasing is based upon the local background colors for each image.

14. The system of claim 1, wherein said anti-aliasing is based upon the global background color.

15. The system of claim 1, wherein said anti-aliasing is based upon the local background color.

16. The system of claim 1, wherein said background color is recomputed at regular intervals.

17. The system of claim 7, wherein said background color is recomputed when changes occur in dynamic background images.

18. A method of anti-aliasing the edges of images displayed against a background on a display unit, said method comprising:

dynamically determining a background color;

adjusting chrominance values for foreground color displayed on said display unit globally and adjusting chrominance values for background color displayed on said display unit locally; and anti-aliasing said edges of said images based upon said dynamically determined background color.

19. The method of claim 18, wherein said images comprise characters of text obtained from a source document and wherein the background color is determined by instructions embedded in the source document.

20. The method of claim 19, wherein said instructions embedded in the source document comprise HTML tags.

21. The method of claim 18, wherein said background color is determined by user controls set by the user.

22. The method of claim 18, wherein said background color is determined by user controls derived from user actions.

23. The method of claim 18, wherein said background color is determined by manufacturer controls, set by the manufacturer of the display unit.

24. The method of claim 18, wherein said images comprise characters of text superimposed upon a graphic image and wherein the background color is determined by the content of said graphic image.

25. The method of claim 24, wherein said content includes a color histogram an entire document.

26. The method of claim 24, wherein said content includes a locally-weighted color histogram for a plurality of pixels.

27. The method of claim 24, wherein said content includes a locally-weighted color histogram for at least one block of pixels.

28. The method of claim 24, wherein said content includes a color histogram edge pixels for the entire source document.

29. The method of claim 18, wherein said anti-aliasing is based upon the adjacent background colors for each edge pixel.

30. The method of claim 18, wherein said anti-aliasing is based upon the adjacent background colors for each image.

31. The method of claim 18, wherein said anti-aliasing is based upon the global background color.

32. The method of claim 18, wherein said anti-aliasing is based upon the local background colors.

33. The method of claim 18, wherein said background color is recomputed at regular intervals.

34. The method of claim 24, wherein said background color is recomputed when changes occur in dynamic background images.

35. The method of claim 18, wherein said anti-aliasing uses a wider color ramp in the vertical direction than in the horizontal direction.

36. The method of claim 18, wherein said anti-aliasing uses a wider color ramp for the chrominance components than for the luminance components.

37. A system for filtering the edges of images displayed against a background on a display unit, said system comprising:

a background color detector for dynamically determining background color; and an image filter for filtering the edges of images based upon said dynamically determined background color;

wherein said background color detector adjusts chrominance values for foreground color displayed on said display unit globally and adjusts chrominance values for background color displayed on said display unit locally.

38. The system of claim 37, wherein said image filter uses a wider filter kernel in the vertical direction than in the horizontal direction.

39. The system of claim 37, wherein said image filter uses a wider filter kernel for the chrominance components than for the luminance components.

40. A method of filtering the edges of images displayed against a background on a display unit, said method comprising:

dynamically determining a background color;

adjusting chrominance values for foreground color displayed on said display unit globally and adjusting chrominance values for background color displayed on said display unit locally; and filtering said edges of said images based upon said dynamically determined background color.

41. The method of claim 40, wherein said filtering uses a wider filter kernel in the vertical direction than in the horizontal direction.

42. The method of claim 40, wherein said filtering uses a wider filter kernel for the chrominance components than for the luminance components.

* * * * *

UNITED STATES PATENT AND TRADEMARK OFFICE
CERTIFICATE OF CORRECTION

PATENT NO.    : 6,577,351 B1                                     Page 1 of 1
DATED         : June 10, 2003
INVENTOR(S)   : Chee Yu et al.

Figure 3:
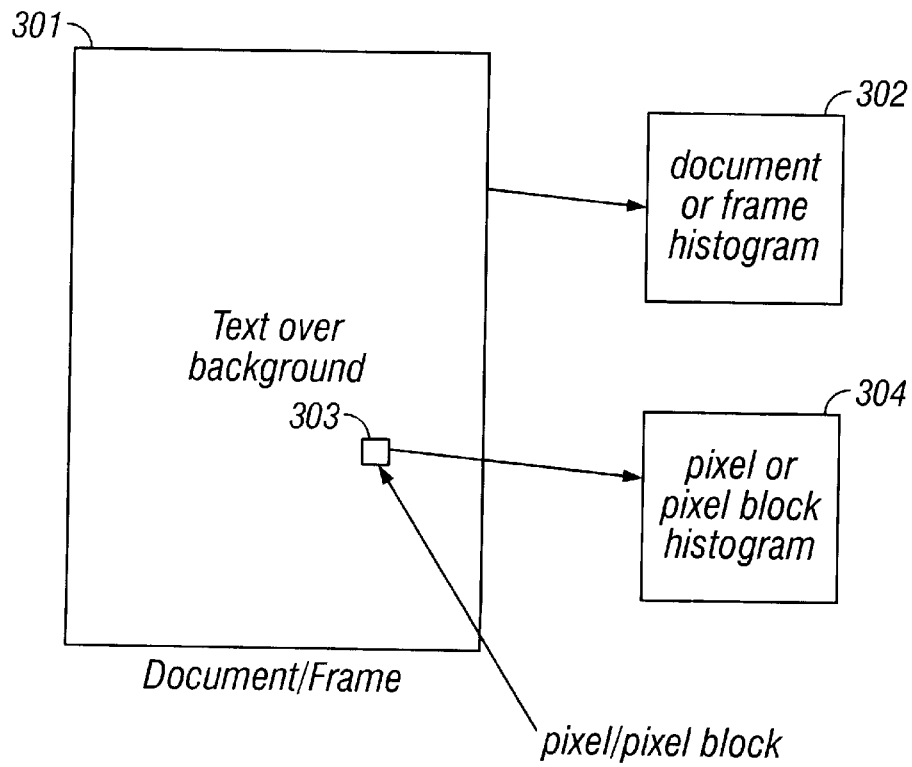
FIG. 3 shows a block diagram of histograms produced at the document/frame level and pixel/pixel block levels on a document for display.

It is certified that error appears in the above-identified patent and that said Letters Patent is hereby corrected as shown below:

Column 3,
Line 65, after "color" insert -- 100 --;
Line 67, change "A" to -- Referring to FIG. 3, a --;

Column 4,
Line 13, change "anti16" to -- anti- --

Column 5,
Line 16, change "221 g<3)" to -- 2<g<3) --

Column 7,
Line 5, change "the" to -- an --;
Line 50, after "histogram" insert -- for --;
Line 57, after "histogram" insert -- for --; and delete "the" and insert -- an --.

Signed and Sealed this

Ninth Day of December, 2003

JAMES E. ROGAN
*Director of the United States Patent and Trademark Office*